Dec. 5, 1961 P. G. MENGE 3,011,226
GUSSET PLATES
Filed Nov. 23, 1960
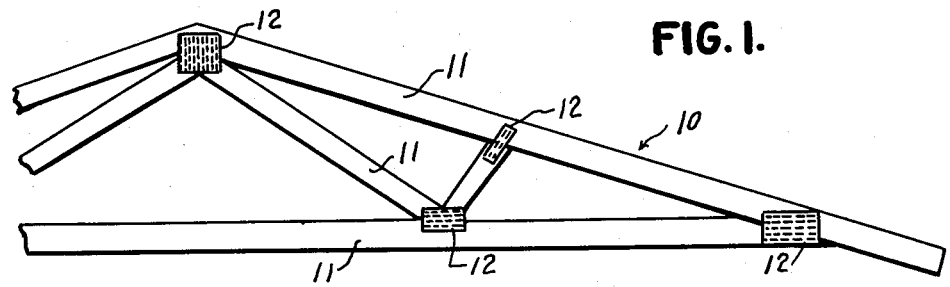
FIG. 1.
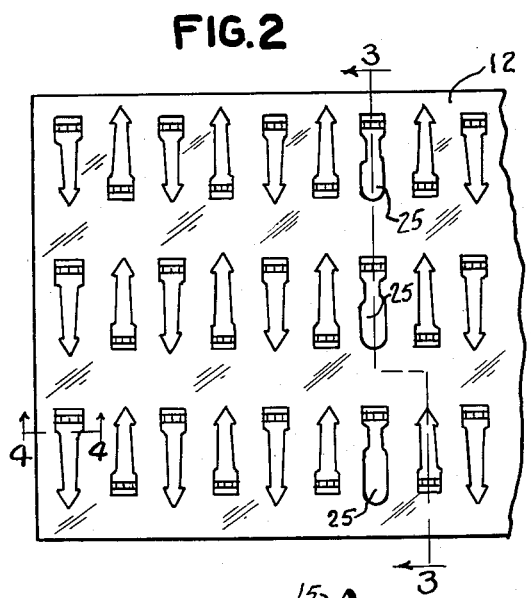
FIG. 2
FIG. 3.
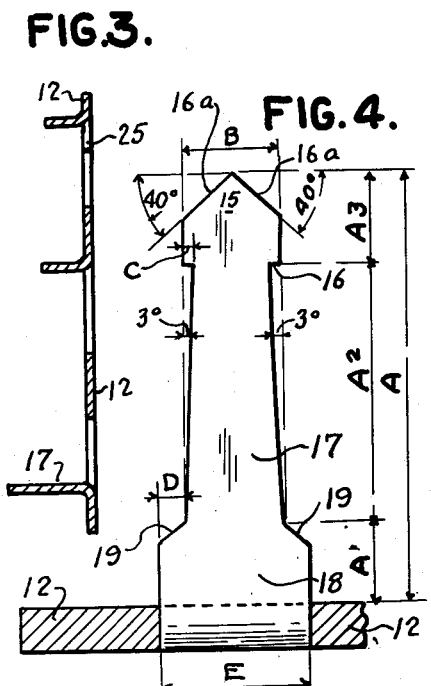
FIG. 4.
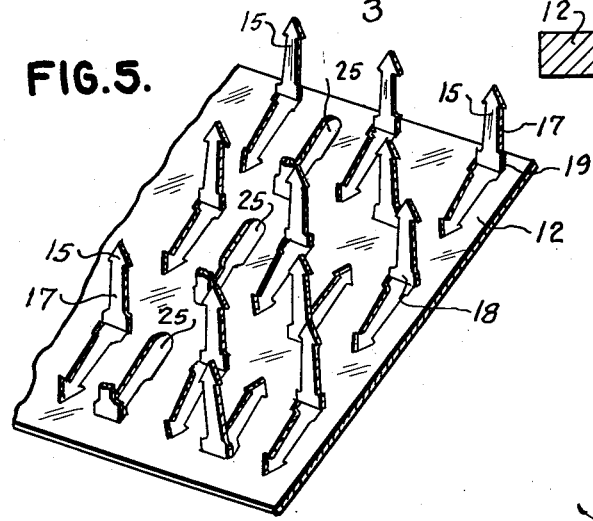
FIG. 5.
*INVENTOR.*
PHILIP G. MENGE
BY
Hauke & Hauke.
ATTORNEYS

United States Patent Office 3,011,226
Patented Dec. 5, 1961

3,011,226
GUSSET PLATES
Philip G. Menge, St. Clair Shores, Mich., assignor to Troy Steel Corporation, Troy, Mich., a corporation of Michigan
Filed Nov. 23, 1960, Ser. No. 70,368
4 Claims. (Cl. 20—92)

This invention relates to a toothed gusset plate particularly constructed to secure abutting wooden beams together for fabricating a truss structure applicable in the building industry, and is a continuation-in-part of my application Serial No. 1,680, filed January 11, 1960, for Gusset Plates and now abandoned.

It is an object of the present invention to provide an improved truss structure by providing a strong mechanical connection between adjoining wooden beams disposed in the same plane which are capable of withstanding the maximum allowable tension and compression stresses.

A further object is to provide a stronger and more rigid fabricated truss structure by the use of gusset nail plates for joining abutting wooden beams or frame members, which plates embody novel punched out nails or teeth so arranged and constructed as to be more positively anchored in the wooden beams or frame members, and which are driven into said wooden beams with a minimum of splitting of the wooden beams.

For a clearer understanding of the invention, reference may be had to the accompanying drawing illustrating a preferred embodiment of the invention in which like characters refer to like parts throughout the several views, and in which:

FIG. 1 is an elevational view of a truss structure showing abutting frame members secured together by gusset plates made in accordance with the principles of the present invention.

FIG. 2 is a plan elevational view of a gusset plate.

FIG. 3 is a sectional view taken on the line 3—3 of FIG. 2.

FIG. 4 is an enlarged detail sectional view taken substantially on the line 4—4 of FIG. 2 and illustrating a detailed modified showing one of the teeth in elevation, and FIG. 5 is a perspective view of a portion of the gusset plate.

The truss structure 10 is illustrated in FIG. 1, and is made up of an assembly of frame members 11, such as 2 x 4 studs, 2 x 3 studs, or other suitable size members which are disposed to lie in the same plane and which are joined together with gusset nail plates 12. These gusset plates join abutting ends or edges of the frame members, as generally shown in FIG. 1, and it may be noted that these overlie the faces of said frame members to a degree sufficient to provide for a secure attachment of the gusset plate in order to carry the prescribed load and to comply with the building construction codes.

These gusset plates may be of different sizes and shapes, though they are most generally rectangular in plan.

The plates are provided with a series of teeth punched therefrom and extending unidirectionally from said plate, preferably at right angles thereto as shown. They are preferably arranged in rows and in staggered relation (see FIGS. 2 and 5).

The truss structure is prefabricated by arranging the frame members or studding in a form, lying in a common plane, and abutting edges or ends thereof are secured together by pressing the aforesaid gusset nail plates against said frame members, thus embedding the teeth into the body of the frame members or studs. Usually, hydraulically actuated clamps or hammers are utilized in this assembly.

In order to insure the solid union between the plate and frame member and to securely hold the embedded teeth in place, the said teeth are formed with a pointed head portion 15 terminating in an inwardly extending shoulder 16 joining with a tapered stem portion 17 and joined with a widened foot portion 18. Said widened foot portion is more particularly joined with the stem portion by a sloping shoulder 19 (see FIGS. 4 and 5), which outwardly slopes towards the gusset plate.

The wooden frame member or studding is pierced by these teeth, the shoulder 16 particularly operable to resist withdrawal of the teeth from the wooden frame member or studding, the sloping shoulder 19 allowing for the teeth to be solidly embedded right up to the hilt, in said wooden frame member or studding.

A part of each plate may be punched out as at 25 to provide indexing apertures so as to not weaken the overall strength of the gusset plate. Said gusset plates are preferably made of a suitable gauged material varying in a thickness according to the application. In most cases a twelve to sixteen gauge sheet metal plate is suitable for this purpose, though I perfer to employ a 14 gauge metal plate.

In general, the punched out nail or tooth portion which comprises the shank or stem portion 17, which terminates in the pointed arrow-like head portion 15, is also provided with said widened foot portion 18 substantially as illustrated in FIG. 4. The shank is preferably tapered as shown (see FIG. 4), the side edges of said shank sloping at an angle of about three degrees with respect to the longitudinal axis of the tooth or nail portion, with the wider part immediately adjacent the base or foot part thereof. Thus the converging side edges provide for a shoulder 16 at the junction of said stem and nail head, and the pointed head of the nail or tooth is provided with slanted edges 16a having a slope of about forty degrees with the plane of the plate, the included angle of said point being about 100 degrees. The precise configuration of the head of the nail or prong is not a specific essential part of the invention, the side edges of the head may be flattened, as shown in FIG. 4 or somewhat pointed as shown in FIGS. 2 and 5. The widened foot portion of the nail or tooth is designed with a sloping shoulder 19, generally sloping towards the gusset plate at about the same angle as the pointed head. The shoulder 16 is constructed of a width of about one-tenth the width of the stem of the nail or tooth, whereas the sloping shoulder 19 has a width of about one-third the width of the stem of the nail or tooth. The entire length of the nail or tooth is preferably about four to six times the width of the stem of the nail or tooth, and generally is about five times longer than the stem width. Obviously the precise length of the nail or tooth may be varied within reasonable limits depending primarily on the kind of beams used, the beam thickness, the grain texture, etc. In general, the actual overall length of each nail or tooth is about one-half inch to three-quarters inch, and the length which I find preferably is about five-eighths of an inch.

While I have made and tested various tooth shapes and sizes, I have found that the general proportions as shown and described make for a nail plate having a maximum of hold possibilities, resistance to slip, resistance to breaking and one which penetrates the beam with a minimum of crushing of the wood fibres and splitting of the beam. The pointed nail or tooth having a slope of about 40 degrees as aforesaid, provides for the penetration with a minimum of splitting of the timber.

The nail or tooth pierces the beam and does of course cut or crush some of the wood fibres, but the pointed head serves to minimize crushing of the wood fibres and to also spread some of the wood fibres, these wood fibres that have been spread apart having the tendency to spring back into the reduced portion of the nail stem. As the nail is driven home to force the plate into surface contact with the face of the beam, the sloping shoulder 19 comes into play and functions to compress these wooden fibres including those that have at least partly sprung back into the reduced width portion of the stem. The compression of the wood fibres by shoulder 19 tightly compacts same behind the shoulder 16 and against the stem, resulting in a tenacious gripping of the nail or tooth by said wood fibres. In general, the important advantage of a nail or tooth constructed as shown and described is that such a nail or tooth has in general about twenty percent more holding power and resistence to slip, and will withstand more loading than others before it fails.

Tests made on my nail plates in comparison with nail plates having no shoulders 16 and/or 19 have shown remarkable results. The present nails or teeth will each resist in the neighborhood of about twenty or more pounds of loading for the same amount of slip. The test reports appended hereto show the results of such tests, and indicate the relative importance of the shoulder 19 in the practical application of my invention in the art. The shoulder construction 19 when used with the undercut shoulder 16 makes for a maximum holding power and is the superior nail; that is, it has the maximum of resistance to tearing out of the beam when subjected to loads. The tapered stem or shank of the nail serves to guide the compressed fibres and tightly wedge same behind the shoulder 16, and to make for more resistance to the withdrawal of the nails or teeth from the beam, particularly since the wood fibres which have been compressed and packed behind the shoulder 16 consist in part of whole fibres and not sheared, crushed or broken fibres. The packed fibres are also wedged tight against the edge of the stem of the nail.

Referring to FIG. 4, the length of the nail is indicated at A, the length of the foot or head as $A^1$, the stem as $A^2$, and the head as $A^3$. $A^1$ is about one-fifth the length of A, and $A^3$ is about the same length as $A^1$ or about one-fifth the length of A, and $A^2$ is about three-fifths the length of A. The width B is about the same as $A^1$ or $A^3$, thus the length of the nail is about five times the width. Dimension C indicates the width of shoulder 16 and is preferably about one-tenth of the width B, and the width D of the sloping shoulder 19 is preferably about one-third of width B.

I find that these general proportions are preferable, though it will be apparent that reasonable tolerances are permissible because the shoulders 16 may in some instances be each constructed with a width possibly as big as one-fifth of the width of the nail. Likewise shoulder 19 may vary from about one-third to one-fourth of the tooth width and the length $A^1$ of said foot or heel portion may be somewhat shorter and may have a length of from one-tenth to one-fifth of A. The design and proportion of this foot portion is aimed to obtain a maximum of compression of the wood fibres without crushing too many of the wood fibres. The width of the stem 17 where same joins the foot portion 18, is about the same as the width of the pointed head portion, and said stem for the most part is less than the width of the said head portion.

The relative proportions of the recessed space in back of shoulder 16 and said foot portion is planned to be such as to provide for a tight packing of the wood fibres behind the shoulder 16 and against the nail stem. While the preferred shape of shoulder 19 is about as specified above, it will be apparent that the angle of this slope may be varied plus or minus about ten or fifteen degrees while the permissible variation in the slope of edges 16a may be plus or minus about five to ten degrees. It may be noted that the shoulder 19 is spaced outwardly from the plane of the gusset plate and said foot portion has a width throughout its length greater than the width "B" of said head portion. Since these are high production items, it is aimed to generally strike an average so that the nail or tooth substantially holds well in all types of wood, consistent with good engineering practice, and which fully meets all FHA specifications and requirements.

The following tables as appended hereto represent the results obtained by testing three different types of nail plates. No. 1, marked "Standard" being the nail disclosed in the present application; No. 2 marked "No Points" being a blunt nail with the base shoulder constructed as shown in FIG. 4 of the present invention; and No. 3, marked "No points or shoulders" being a straight nail with no shoulders. The tests were made on a set of nail plates, having 35 effective nails, and similar tests on a set of nail plates having 42 effective nails. The beams were loaded and pulled apart, means being attached to the test samples to show the amount of "slip" between the nail plate and beam under successively increasing loads.

*Load per tooth—35 effective teeth*

| No. 1 Standard | No. 2 No Points | No. 3, No Points, No shoulders | Slip |
|---|---|---|---|
| 80 | 60 | 50 | .001 |
| 100 | 90 | 80 | .002 |
| 120 | 110 | 100 | .0025 |
| 140 | 140 | 120 | .004 |
| 170 | 170 | 150 | .007 |
| 180 | 180 | 160 | .009 |
| 190 | 190 | 170 | .013 |
|  |  | Fail |  |

*Load per tooth—42 effective teeth*

| No. 1 | No. 2 | No. 3 | Slip |
|---|---|---|---|
| 50 | 60 | 50 | .001 |
| 90 | 90 | 70 | .002 |
| 100 | 100 | 85 | .0025 |
| 130 | 130 | 115 | .0045 |
| 160 | 160 | 140 | .0075 |
| 170 | 170 | 150 | .009 |
| 180 | Failed | 160 | .0105 |
| 190 |  | Failed | .013 |

It will be observed that a nail or tooth with no shoulder or points pulled out and failed before either the No. 1 or No. 2 nail. The No. 2 nail which embodied the shoulder 19 was almost as good as the No. 1 nail which embodied both the shoulders 16 and 19, and pointed end. It will be noted that the samples or specimens having the shoulder 19 only, were superior to the straight nail or tooth that are presently used in the industry. A blunt nail or tooth results in more crushing and fracturing of the wood fibres than a pointed nail. The shoulder 19 of the present invention nail functions to bend and compress the wood fibres, such compression serving to tightly pack the wood fibres against the edge of the nail stem and when used with the shoulder 16, such compression serves to pack the wood fibres against the shoulder 16 and thus still more securely hold the nail or tooth in the wood beam. The sloping shoulder 19 is desirable over a flat shoulder 19 since a sloping shoulder provides for a progressive application of pressure and also does not materially cut or crush said wood fibres in the main body of the beam.

The basic improvement of the present nail is the construction of the shoulder 19 which packs the wood fibres against the nail, and preferably the shoulder 19 slopes to progressively apply such compression, and finally it has proved to be especially beneficial when combined with a pointed nail having the shoulder 16 and a tapered stem. Thus the shoulder 19, preferably sloping as shown, is a big improvement by itself over the nails previously used in industry and the better and improved results obtained constitute a decided advance in the art, and when used with a pointed nail and tapered stem and shoulder 16, the results are still better.

Although but one form of the invention is described in detail, changes and modifications may be made therein without departing from the spirit of the invention or from the scope of the appended claims.

I claim:

1. A toothed gusset plate for securing abutting wooden structure members together to form a fabricated truss structure comprising a metal plate having a series of teeth punched therefrom and extending unidirectionally from the plate and substantially normal to the plane of said plate, said teeth each comprising a pointed head portion, a stem portion having straight sides and a foot portion, said pointed head portion having undercut inwardly extending shoulders joining the head portion with the outermost end of said stem portion, said foot portion having laterally outwardly extending shoulders joined with the inner base part of said stem portion and sloping towards said gusset plate and facing the aforesaid undercut shoulders of the head portion, the stem portion connecting said head and foot portions having a length at least more than the total combined length of said head and foot portions and having a width for substantially its entire length which is for the most part less than and at least not greater than the width of said pointed head portion, said foot portion being of greater width throughout than said head portion, the sloping shoulders of said foot portion being outwardly spaced from the junction of the foot portion with the gusset plate, the side edges of the foot comprising substantially straight parallel edges extending substantially normal to the plane of the plate and at an angle to the said sloping shoulders, said widened foot portion being operable on driving home the toothed plate in said wooden structures to compress the wood fibres and to tightly pack same against the stem and the undercut shoulder.

2. A toothed gusset plate as defined in claim 1, wherein the sloping shoulders of the foot portion are outwardly inclined towards the gusset plate at an angle of approximately forty degrees with respect to the plane of the said gusset plate.

3. A toothed gusset plate as defined in claim 1, wherein the said straight side edges of said stem portion connect the inner extremities of the undercut shoulders of the head portion with the inner extremities of the outwardly sloping shoulders of the foot portion.

4. A toothed gusset plate as defined in claim 3, wherein the said teeth have an overall length about five times the width of the stem, said pointed head portion and said foot portion being of a greater width than the stem portion, each of said head portions and said foot portions having a length about one-fifth the total length of the tooth, said stem having tapered edges connecting said head and foot portions, said widened foot portion forming opposed laterally extending sloping shoulders at the base of the stem portion and each shoulder having a width of about one-third the width of the stem portion, said undercut shoulders of the head portion disposed on either side of the stem and each having a width about one-tenth the width of the stem, said stem portion having a length greater than the combined length of said head and foot portions and about three-fifths of the length of the tooth.

References Cited in the file of this patent

UNITED STATES PATENTS

| | | |
|---|---|---|
| 2,182 | Ballard | July 17, 1841 |
| 252,119 | McMaster | Jan. 10, 1882 |
| 409,546 | Zeigler | Aug. 20, 1889 |
| 434,436 | Eckert | Aug. 19, 1890 |
| 441,227 | Cary | Nov. 25, 1890 |
| 493,882 | White | Mar. 21, 1893 |
| 527,184 | Richey | Oct. 9, 1894 |
| 527,308 | Wood | Oct. 9, 1894 |
| 705,626 | Vogel | July 29, 1902 |
| 805,212 | Litz | Nov. 21, 1905 |
| 828,125 | Steinmetz | July 17, 1906 |
| 845,639 | Herriman | Feb. 26, 1907 |
| 874,514 | Lindow | Dec. 24, 1907 |
| 1,015,402 | Romunder | Jan. 23, 1912 |
| 1,089,878 | Steinhauser | Mar. 10, 1914 |
| 1,197,291 | Holter | Sept. 5, 1916 |
| 1,219,123 | Macmechen et al. | Mar. 13, 1917 |
| 1,247,933 | Colpitte | Nov. 27, 1917 |
| 1,297,611 | Upson | Mar. 18, 1919 |
| 1,358,922 | Barber | Nov. 16, 1920 |
| 1,373,036 | Upson | Mar. 29, 1921 |
| 1,373,875 | Fallon | Apr. 5, 1921 |
| 1,402,304 | Lord | Jan. 3, 1922 |
| 1,426,232 | Theodorsen | Aug. 15, 1922 |
| 1,470,251 | Ahlvin | Oct. 9, 1923 |
| 1,492,596 | Fenno | May 6, 1924 |
| 1,668,469 | Sackett | May 1, 1928 |
| 1,669,541 | Spreen | May 15, 1928 |
| 1,786,991 | Greim | Dec. 30, 1930 |
| 1,806,522 | De Gruyter | May 19, 1931 |
| 2,099,273 | Myer | Nov. 16, 1937 |
| 2,100,415 | Theodorsen | Nov. 30, 1937 |
| 2,108,831 | Snyder | Feb. 22, 1938 |
| 2,325,766 | Gisondi | Aug. 3, 1943 |
| 2,369,525 | Blaski | Feb. 13, 1945 |
| 2,477,163 | Barnett | July 25, 1949 |
| 2,551,970 | Sampson | May 8, 1951 |
| 2,603,828 | Dickinson | July 22, 1952 |
| 2,827,676 | Sanford | Mar. 25, 1958 |
| 2,844,852 | West | July 29, 1958 |
| 2,877,520 | Jureit | Mar. 17, 1959 |
| 2,885,749 | Jureit | May 12, 1959 |
| 2,937,418 | Sanford | May 24, 1960 |
| 2,974,378 | Lidsky | Mar. 14, 1961 |

FOREIGN PATENTS

| | | |
|---|---|---|
| 391,257 | Great Britain | 1933 |
| 113,714 | Sweden | 1945 |
| 851,253 | Germany | 1949 |